United States Patent [19]

Hidano et al.

[11] Patent Number: 4,797,015
[45] Date of Patent: Jan. 10, 1989

[54] ROLLER CAGE ASSEMBLY FOR USE IN A BEARING

[75] Inventors: Kengo Hidano, Fujisawa; Susumu Amano, Ayase, both of Japan

[73] Assignee: Nippon Thomson Co., Ltd., Japan

[21] Appl. No.: 124,331

[22] Filed: Nov. 20, 1987

Related U.S. Application Data

[63] Continuation of Ser. No. 863,642, May 15, 1986, abandoned.

[30] Foreign Application Priority Data

May 20, 1985 [JP] Japan ............................... 60-106124

[51] Int. Cl.$^4$ ............................................. F16C 33/46
[52] U.S. Cl. .................................................... 384/580
[58] Field of Search ............... 384/580, 577, 578, 527, 384/533

[56] References Cited

U.S. PATENT DOCUMENTS

| 1,100,179 | 6/1914 | Foster | 384/580 |
| 3,431,037 | 3/1969 | Benson | 384/580 |
| 3,802,754 | 4/1974 | Pitner | 384/580 |
| 4,623,270 | 11/1986 | Olschewski et al. | 384/580 |

Primary Examiner—Lenard A. Footland
Attorney, Agent, or Firm—Thomas S. MacDonald; Alan H. MacPherson; Paul J. Winters

[57] ABSTRACT

A roller-cage assembly for use in a bearing includes a cylindrical cage provided with a plurality of openings extending axially and spaced apart from one another circumferentially and a plurality of rollers, each of which is received in a corresponding one of the openings. Each opening is defined by a pair of oppositely disposed side guide surfaces and a pair of oppositely disposed end guide surfaces, whereby the distance between the pair of oppositely disposed side guide surfaces is larger than the diameter of the roller and the distance between the pair of opposite end guide surfaces is larger than the length of the roller, so that the roller may rotate freely within the opening. Also provided are at least a pair of oppositely disposed outer projections, which project oppositely from the pair of oppositely disposed side guide surfaces at their outermost locations, and at least a pair of oppositely disposed inner projections, which project oppositely from the pair of oppositely disposed side guide surfaces at their innermost locations, whereby the distance between the tips of each pair of the oppositely disposed inner and outer projections is smaller than the diameter of the roller. Thus, the roller is prevented from being undesirably removed from the cage radially by the inner and outer projections, axially by the pair of end guide surfaces, and circumferentially by the pair of side guide surfaces.

8 Claims, 2 Drawing Sheets

ROLLER CAGE ASSEMBLY FOR USE IN A BEARING

This application is a continuation of application Ser. No. 06/863,642, filed May 15, 1986, abandoned.

BACKGROUND OF THE INVENTION

1. Field of the Invention

This invention generally relates to a rolling contact bearing, and, in particular, to a roller-cage assembly for use in such a rolling contact bearing.

2. Description of the Prior Art

A roller-cage assembly for use in a bearing is well known in the art, and it includes a cage which is a frame for maintaining uniform spacing between the rollers in a bearing. For example, the roller-cage assembly is used to support an end of a large shaft of an internal combustion engine. And, as the performance of the engine is improved, the roller-cage assembly is required to withstand increased loads. In order to withstand a large load, it is desired to provide more rollers for a given pitch diameter. The maximum number of rollers may be provided if no cage is provided to hold the rollers as spaced apart from each other at a predetermined spacing. However, this would cause other disadvantages, such as skewing and escaping of the rollers and difficulty in assembly steps. Thus, it is better to provide a cage for holding the rollers at a predetermined spacing so as not to cause other disadvantages.

Japanese Utility Model Application, No. 51-33608 (Laid-Open Pub. No. 52-124353), assigned to the assignee of this application, discloses a roller-cage assembly capable of holding an increased number of rollers at a predetermined spacing. However, the roller-cage assembly proposed in that Utility Model Application has some structural constraints, so that difficulty is encountered in manufacture and the number of manufacturing steps is large. Thus, there has been a need to provide an improved roller-cage assembly for use in a rolling contact bearing.

SUMMARY OF THE INVENTION

In accordance with the present invention, there is provided an improved roller-cage assembly for use in a bearing, wherein the cage is generally cylindrical in shape and is provided with a plurality of axial openings, each of which receives therein a roller. Each of the openings is generally rectangular in shape and it is provided with at least a pair of outer projections which are provided to project from the opposite sides of the opening at the outermost circumference of the cage such that the distance between the tip ends of the pair of outer projections is smaller than the diameter of the roller received in the opening. The cage is also provided with at least a pair of inner projections which are located radially inwardly of the pair of outer projections and which also project from the opposite sides of the opening such that the distance between the tip ends of the pair of inner projections is smaller than the diameter of the roller received in the opening. The opening is defined by a pair of side guide surfaces and a pair of end guide surfaces, and the distance between the pair of side guide surfaces is larger than the diameter of the roller received in the opening and the distance between the pair of end guide surfaces is larger than the length of the roller. Thus, when the roller is placed inside of the opening, it is prevented from slipping away radially by the inner and outer projections, axially by the end guide surfaces, and circumferentially by the side guide surfaces. However, the roller received in the opening may rotate therein because the opening is larger in size than the roller.

It is therefore a primary object of the present invention to obviate the disadvantages of the prior art and to provide an improved roller-cage assembly for use in a rolling contact bearing.

Another object of the present invention is to provide an improved roller-cage assembly for use in a rolling contact bearing, capable of holding a maximum number of rollers for a given pitch diameter, thereby providing an increased load bearing capability.

A further object of the present invention is to provide a improved roller-cage assembly for use in a bearing, which is high in performance, simple to manufacture, and high in accuracy.

Other objects, advantages and novel features of the present invention will become apparent from the following detailed description of the invention when considered in conjunction with the accompanying drawings.

DESCRIPTION OF THE PREFERRED EMBODIMENTS

Figure 1:
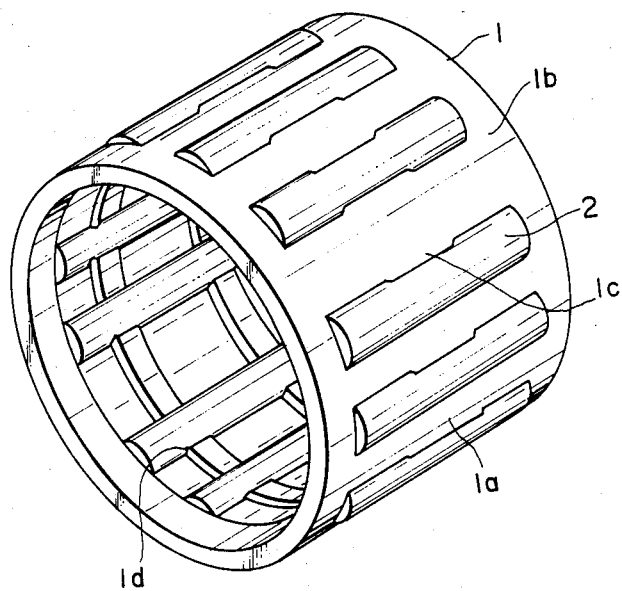
FIG. 1 is a perspective view showing a roller-cage assembly constructed in accordance with one embodiment of the present invention.
Figure 2:
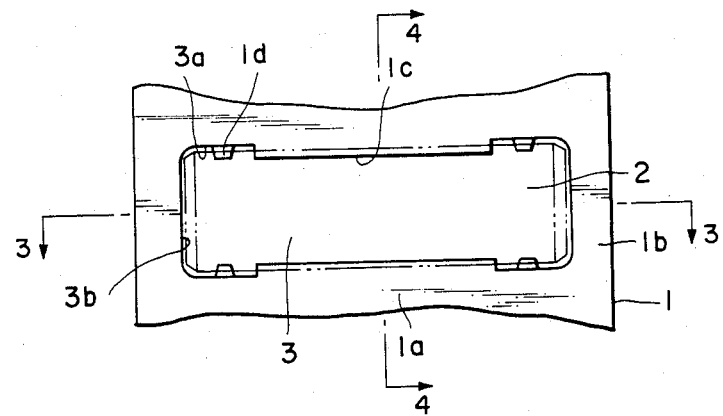
FIG. 2 is a schematic illustration showing on an enlarged scale part of the assembly of FIG. 1.

Referring to FIG. 1, there is shown a roller-cage assembly for use in a rolling contact bearing, and it generally includes a cage 1 and a plurality of rollers 2 rotatably held by the cage as spaced apart from one another. The cage 1 is generally cylindrical in shape and it is provided with a plurality of openings 3 extending in the axial direction and spaced apart from one another in the circumferential direction. With the provision of the openings 3, the cage 1 is formed with a plurality of main stays or axial sections 1a and a pair of side stays or end circumferential sections 1b. Each of the rollers 2 is received in the corresponding one of the openings 3 so as to be rotatable therein. As best shown in FIG. 2, the opening 3 is generally rectangular in shape and it is defined by a pair of opposite side guide surfaces 3a and a pair of opposite end guide surfaces 3b.

Figure 3:
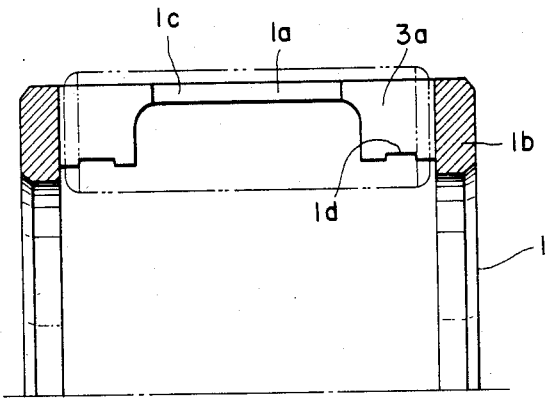
FIG. 3 is a longitudinal cross section view taken on the lines 3—3 of FIG. 2.
Figure 4:
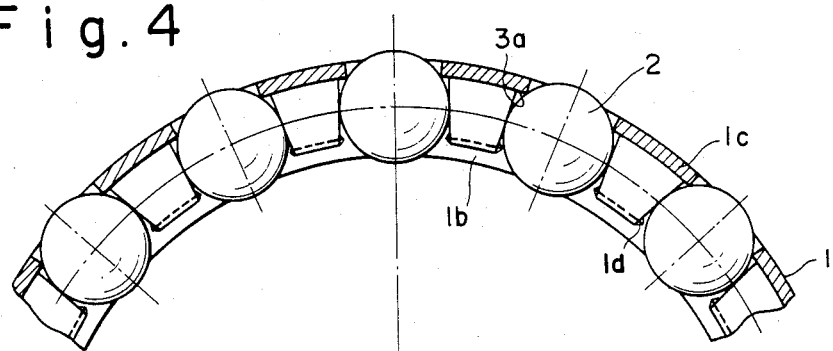
FIG. 4 is a partial transverse cross section view taken on the lines 4—4 of FIG. 2.

In the illustrated embodiment, as best shown in FIGS. 3 and 4, the side guide surfaces 3a are defined by the side walls of the main stays 1a, and the central inner portions of the main stays 1a are recessed. Thus, in fact, as shown in FIG. 3, each of the side guide surface 3a are divided by the center recess. On the other hand, the end guide surfaces 3b are defined by the inner side walls of the side stays 1b. It is to be noted that the distance between the pair of opposed side guide surfaces 3a and 3a is slightly larger than the diameter of the roller 2 to be received in the opening 3, and the distance between the pair of opposed end guide surfaces 3b and 3b is slightly larger than the length of the roller 2. Thus, when the roller 2 is placed in position in the opening 3, the roller may rotate freely therein.

The cage 1 also includes a pair of outer projections 1c for each of the openings 3, and the pair of outer projections 1c project from the opposite side guide surfaces 3a at the outermost circumference. The pair of outer projections 1c, thus, extend opposite to each other and the distance between the tip ends of the pair of outer projections 1c is slightly smaller than the diameter of the roller 2 to be received in the opening 3. The cage 1 also includes a pair of inner projections 1d which are provided at the innermost radial position of the main stay 1a such that they project toward each other from the opposite side guide surfaces 3a. In the embodiment illustrated in FIG. 2, the pair of outer projections 1c are provided along a center portion of each of the side guide surfaces 3a at its radially outermost end. And, each of the pair of opposite inner projections 1d is divided because of the presence of a recess in each of the main stays 1a. Thus, in the embodiment illustrated in FIG. 2, there are actually two pairs of inner projections 1d, each pair located near the corresponding end guide surface 3b. It is to be noted that the distance between the tip ends of the pair of opposite inner projections 1d is slightly smaller than the diameter of the roller 2. Thus, the outer and inner projections 1c and 1d, respectively, are separated from each other over a distance approximately corresponding to the thickness of the main stay 1a.

Therefore, the roller 2 received in position in the opening 3 is restrained from slipping away radially by the outer and inner projections 1c and 1d, axially by the pair of end guide surfaces 3b, and circumferentially by the pair of side guide surfaces 3a. With this structure, the roller 2 may be well maintained in the corresponding opening 3 and yet it may rotate freely in the opening. Besides, the full length of each of the rollers 2 may be presented for use in rolling contact with an associated element. Moreover, the number of rollers 2 per pitch diameter is maximized, so that there is provided a maximum load bearing capability for a given pitch diameter.

Figure 5:
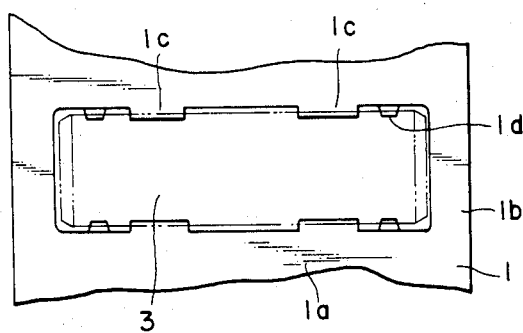
FIG. 5 is a schematic illustration showing a part of a roller-cage assembly constructed in accordance with another embodiment of the present invention.

FIG. 5 shows another embodiment of the present invention, in which each of the paired outer projection 1c is divided by removing a central portion thereof. In this manner, each of the outer and inner projections 1c and 1d, respectively, may be divided into a desired number of portions. Or, as mentioned before, the divided inner projections 1d and 1d provided at the same side guide surface 3a may be integrated into a single inner projection, if desired. Since the roller 2 must be forcibly fitted into the corresponding opening 3 during assembly, the divided projections as shown in FIG. 5 provide more flexibility and thus facilitate putting the roller 2 into the opening 3 without causing any undesired deformations to the main and side stays 1a and 1b, respectively. However, if an increased integrity or mechanical strength is desired, each of the outer and inner projections 1c and 1d, respectively, may be provided as undivided. Furthermore, any material, such as plastic or metal, may be used to form the cage 1.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A roller-cage assembly for use in a bearing, comprising:

a cylindrical cage including a plurality of axial sections arranged circumferentially and spaced apart from one another and a pair of end sections each connected to one end of each of said plurality of axial sections, each of said axial sections providing a side guide surface at each side thereof and each of said pair of end sections providing an end guide surface at an inner side thereof, whereby openings are defined between the side guide surfaces of any two adjacent axial sections and said pair of end guide surfaces, each of said axial sections having a central inner portion of an inner surface thereof removed, thereby making said central portion locally thinner than the remaining portion of such of said axial sections in the radial direction of said cage and dividing said side guide surface at each side substantially into a pair of side guide surface portions spaced apart from each other and each located adjacent to a corresponding one of said pair of end sections;

at least one outer projection provided at an outermost location of said guide surface;

at least one inner projection provided at an innermost location of said side guide surface;

a plurality of rollers, each of which is received in a corresponding one of said openings; and whereby the distance between the side guide surfaces of each of the openings is larger than the diameter of a roller, the distance between the end guide surfaces of each of the openings is larger than the length of a roller, and distances between tip ends of the oppositely disposed outer projections and between oppositely disposed inner projections of an opening are smaller than the diameter of a roller.

2. The assembly of claim 1 wherein said outer and inner projections are formed integrally with the cage.

3. The assembly of claim 2 wherein said opening is generally rectangular in shape.

4. The assembly of claim 1 wherein each of said plurality of axial sections has a thickness smaller than the diameter of the roller.

5. The assembly of claim 1 wherein two of said inner projections are provided for the side guide surface with each located closer to a corresponding one of said end guide surfaces.

6. The assembly of claim 5 wherein said outer projection is provided generally at a central portion of said side guide surface at its outermost location.

7. The assembly of claim 1 wherein said at least one inner projection extends outboard of said outer projections.

8. The assembly of claim 7 wherein one of said at least one inner projection is provided for each of said side guide surface portions.

* * * * *